United States Patent
Lee et al.

(10) Patent No.: US 7,473,035 B2
(45) Date of Patent: Jan. 6, 2009

(54) BEARING ASSEMBLY AND METHOD FOR MANUFACTURING THE SAME

(75) Inventors: Dai Gil Lee, Daejeon (KR); Dong Chang Park, Daejeon (KR); Seong Min Lee, Daejeon (KR); Byung Chul Kim, Busan (KR); Hak Sung Kim, Asan-si (KR); Sung Su Kim, Geojae-si (KR); Jong Woon Kim, Seoul (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 11/679,038

(22) Filed: Feb. 26, 2007

(65) Prior Publication Data

US 2007/0140607 A1    Jun. 21, 2007

Related U.S. Application Data

(62) Division of application No. 11/044,294, filed on Jan. 28, 2005, now Pat. No. 7,182,518.

(30) Foreign Application Priority Data

Jan. 29, 2004  (KR) .................... 10-2004-0005793
Sep. 2, 2004   (KR) .................... 10-2004-0069955

(51) Int. Cl.
    *F16C 25/04* (2006.01)
(52) U.S. Cl. ..................... 384/208; 384/298
(58) Field of Classification Search ............... 384/206, 384/208, 209, 210, 213, 214, 298
    See application file for complete search history.

(56) References Cited

U.S. PATENT DOCUMENTS

| | | | | | |
|---|---|---|---|---|---|
| 2,838,436 | A | * | 6/1958 | Clingman | 384/298 |
| 3,266,123 | A | * | 8/1966 | McCloskey | 29/898.047 |
| 3,328,100 | A | * | 6/1967 | Spokes et al. | 384/298 |
| 3,375,027 | A | | 3/1968 | Jurgen | |
| 3,582,166 | A | * | 6/1971 | Reising | 384/213 |
| 3,594,049 | A | * | 7/1971 | Turner | 384/206 |
| 3,597,025 | A | * | 8/1971 | Ringel | 384/209 |
| 3,779,619 | A | * | 12/1973 | Van Dorn et al. | 384/206 |
| 4,060,287 | A | | 11/1977 | Orkin | |
| 5,328,273 | A | | 7/1994 | Nonaka et al. | |

* cited by examiner

*Primary Examiner*—Thomas R Hannon
(74) *Attorney, Agent, or Firm*—Lowe Hauptman Ham & Berner

(57) ABSTRACT

A bearing assembly includes a spherical journal and a hemispherical bearing that is made of a fiber reinforced composite and has a bearing surface for establishing a spherical pair with the spherical journal. The fiber reinforced composite can be constructed by arranging a uni-directional prepreg, woven fiber prepregs and staple-fiber prepregs in a variety of configurations, and thermoplastic resin particles or self-lubrication particles are uniformly provided on the bearing surface. It is possible to alleviate stress concentration generated on the bearing surface by forming a plurality of air channels capable of imparting directivity on an outer surface of the hemispherical bearing.

15 Claims, 14 Drawing Sheets

BEARING ASSEMBLY AND METHOD FOR MANUFACTURING THE SAME

RELATED APPLICATIONS

This application as a divisional of U.S. application Ser. No. 11/044,294, filed Jan. 28, 2005, now U.S. Pat. No. 7,182,518, which claims priority from Korean Application Numbers 10-2004-0005793, filed Jan. 29, 2004 and 10-2004-0069955, filed Sep. 2, 2004, all of which are incorporated by reference herein in their entirety.

BACKGROUND OF THE INVENTION

1. Field of the Invention

The present invention relates to a bearing assembly and a method for manufacturing the same, and more particularly, to a bearing assembly in which a fiber reinforced composite (FRC) is used to secure mechanical strength as well as to reduce a friction coefficient and stress concentration, thereby improving reliability, and a method for manufacturing the same.

2. Description of the Background Art

A hemispherical bearing is a mechanical element that supports a spherical journal and is used in a variety of machines and apparatuses. The spherical journal and the hemispherical bearing are used as a ball joint for connecting two components to allow free movement of the two components. In the case of a ball joint, the hemispherical bearing is called a "housing socket" and the spherical journal is called a "ball stud."

The structure of a bearing assembly into which a conventional spherical journal and a conventional hemispherical bearing are combined will be described with reference to FIG. 1. The hemispherical bearing 10 has a generally hemispherical bearing surface 12, and the spherical journal 20 is received in the bearing surface 12 which establishes a spherical pair with the spherical journal 20. A connecting rod 22 that transmits a load is connected to a side of an outer surface of the spherical journal 20, and the hemispherical bearing 10 is mounted in a recess 32 of a piston 30. The connecting rod 22 moves in the direction which a load is applied and simultaneously rotates within a certain angular range by means of the spherical pairing of the spherical journal 20 and the hemispherical bearing 10, and the load applied to the connecting rod 22 is transmitted to the piston 30.

The conventional hemispherical bearing 10 has been used in a suspension of a caterpillar vehicle with high mobility. According to the kind of caterpillar vehicle and the installation location of the hemispherical bearing 10, an average surface pressure of 200 MPa or more is applied on the bearing surface 12. Therefore, the hemispherical bearing 10 should be made of a material which can withstand high compressive force. Further, since it is usually difficult to continuously supply a lubricant oil due to characteristics of the installation of the hemispherical bearing 10, it is required that the material for the hemispherical bearing 10 have high compressive strength as well as oil-free lubrication and wear-resistant properties.

Accordingly, a strand prepreg made by impregnating reinforcement fibers such as carbon fibers or graphite fibers in a thermoplastic resin has been used as the material for the hemispherical bearing 10. In such a strand prepreg, reinforcement fibers are arranged in several directions or in random directions without directivity. The strand prepreg is subjected to cutting and hot compression molding to manufacture the hemispherical bearing 10. Further, the hemispherical bearing 10 may be made of a thermoplastic composite such as polyetheretherketone (PEEK) reinforced with carbon fiber fabrics.

The bearing surface 12 of the hemispherical bearing 10 is conventionally made by cutting a thick plate that is formed by laminating a fiber reinforced thermoplastic composite into multiple layers and performing hot compression molding thereto. However, such a conventional technique has a problem in that it is difficult to perform cutting due to severe tool wear. Moreover, the conventional technique has a problem in that a processing rate cannot be increased due to damage to the strand prepreg, resulting in increased production costs. In addition, the conventional technique has a problem in that an allowable load is lowered due to cracks generated in the hemispherical bearing 10.

Meanwhile, when parts such as the hemispherical bearing 10 and the piston 30 are assembled or disassembled, a hermetically sealed space is formed between the hemispherical bearing 10 and the piston 30, which makes the assembly and disassembly of the hemispherical bearing 10 difficult. To overcome the aforementioned problems, in the prior art, an air vent hole 14 that penetrates the center of the hemispherical bearing 10 is formed to facilitate the assembly and disassembly of the hemispherical bearing 10 and the piston 30.

In addition, the reinforcement fiber exhibits anisotropy in which friction coefficients in longitudinal and vertical directions differ from each other according to the kind thereof. For example, carbon fiber is a material with high anisotropy in which a friction coefficient is low in a longitudinal direction. The arrangement orientation of the reinforcement fibers is not constant on the bearing surface 12 of the hemispherical bearing 10 manufactured through the hot compression molding of the strand prepreg. Accordingly, in the conventional hemispherical bearing 10, the moving direction of the spherical journal 20 cannot be coincident with the orientation of the reinforcement fibers, thereby causing a disadvantage in that the anisotropy of the reinforcement fibers in view of their wear properties cannot be sufficiently utilized.

Further, the formation of the air vent hole 14 at the center of the bearing surface 12 with greatest stress concentration has a potential problem in that a crack may be easily created from the periphery of the air vent hole 14. The growth of such a crack causes breakage of the hemispherical bearing 10, greatly reducing its life and lowering its reliability. In addition, there is a disadvantage in that hard particles or debris created due to wear of the spherical journal 20 and the hemispherical bearing 10 aggravate the wear phenomenon.

SUMMARY OF THE INVENTION

The present invention is conceived to solve the aforementioned problems in the prior art. The first object of the present invention is to provide a bearing assembly in which a fiber reinforced composite is used to secure mechanical strength, and a method for manufacturing the same.

The second object of the present invention is to provide a bearing assembly in which a friction coefficient of a bearing surface is reduced to greatly improve reliability, and a method for manufacturing the same.

The third object of the present invention is to provide a bearing assembly in which lubrication performance is improved and the life of the bearing assembly can be assured by capturing hard particles generated due to wear, and a method for manufacturing the same.

The fourth object of the present invention is to provide a bearing assembly in which stress concentration on a bearing surface can be alleviated by forming a plurality of air channels capable of imparting directivity to an outer surface of a hemispherical bearing, and a method for manufacturing the same.

The fifth object of the present invention is to provide a bearing assembly that can be conveniently assembled to and disassembled from other parts, and a method for manufacturing the same.

The sixth object of the present invention is to provide a bearing assembly and a method for manufacturing the same, wherein a hemispherical bearing can be conveniently and accurately manufactured by means of near-net shape manufacturing of a bushing made of a fiber reinforced composite and a housing made of a material with superior thermal conductivity.

The seventh object of the present invention is to provide a bearing assembly in which adhesion and deterioration occurring between a spherical journal and a bearing surface due to radiation of frictional heat from a housing are prevented, thereby assuring the life thereof, and a method for manufacturing the same.

According to a first aspect of the present invention for achieving the objects, there is provided a bearing assembly comprising a spherical journal and a hemispherical bearing that is made of a fiber reinforced composite with a plurality of reinforcement fibers arranged at certain intervals in multiple layers and fixed in a matrix and has a bearing surface for establishing a spherical pair with the spherical journal and an outer surface formed with a plurality of air channels capable of imparting directivity.

According to a second aspect of the present invention, there is provided a bearing assembly comprising a spherical journal, a bushing that is made of a fiber reinforced composite with a plurality of reinforcement fibers arranged at certain intervals in multiple layers and fixed in a matrix and has a bearing surface for establishing a spherical pair with the spherical journal, and a housing having a recess to which the bushing is fixed.

According to a third aspect of the present invention, there is provided a method for manufacturing a bearing assembly, comprising the steps of arranging a uni-directional prepreg as an uppermost layer to define a bearing surface of a hemispherical bearing for establishing a spherical pair with a spherical journal, the uni-directional prepreg having a plurality of reinforcement fibers arranged in one direction; laminating and arranging a plurality of staple-fiber prepregs and woven fabric prepregs beneath the uni-directional prepregs in a sandwich-like manner; arranging a lowermost layered woven fabric prepreg as a lowermost layer to define an outer surface of the hemispherical bearing; performing hot compression molding of the uni-directional prepregs, the staple-fiber prepregs, the woven fabric prepregs and the lowermost layered woven fabric prepreg into the hemispherical bearing; cooling and solidifying the hemispherical bearing that hot compression molding is performed; and establishing a spherical pair of the spherical journal and the bearing surface of the hemispherical bearing.

According to a fourth aspect of the present invention, there is provided a method for manufacturing a bearing assembly, comprising the steps of preparing a fiber reinforced composite with a plurality of uni-directional prepregs laminated to define a bearing surface for establishing a spherical pair with a spherical journal; aligning a recess of a housing to which the fiber reinforced composite can be mounted, beneath the fiber reinforced composite; performing hot compressing molding of the fiber reinforced composite into a bushing so that the fiber reinforced composite is fixed to the recess of the housing; cooling and solidifying the bushing that hot compression molding is performed; and establishing a spherical pair of the spherical journal and the bearing surface of the bushing.

BRIEF DESCRIPTION OF THE DRAWINGS

The above and other objects, features and advantages of the present invention will become apparent from the following description of preferred embodiments in conjunction with the accompanying drawings, in which.

DETAILED DESCRIPTION OF THE INVENTION

Hereinafter, preferred embodiments of a bearing assembly according to the present invention will be described in detail with reference to accompanying drawings.

Figure 1:
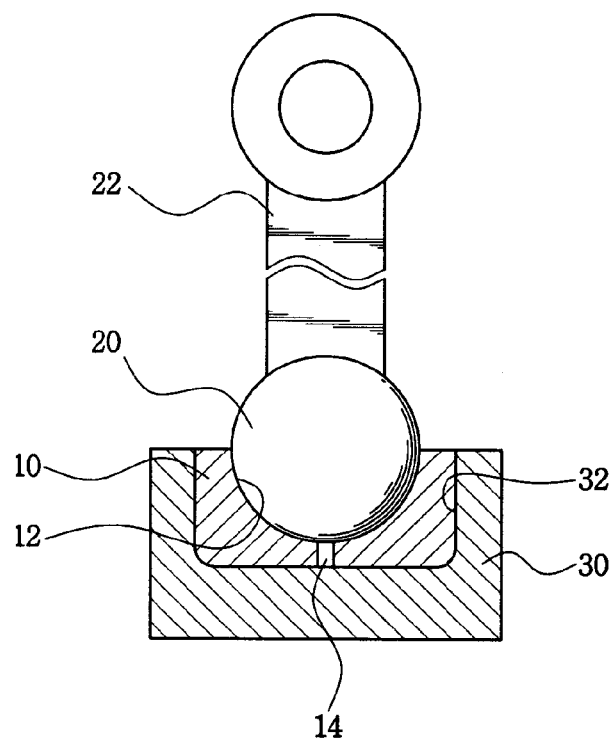
FIG. 1 is a sectional view showing an example of a bearing assembly constructed by combining a conventional hemispherical bearing and a conventional spherical journal.
Figure 2:
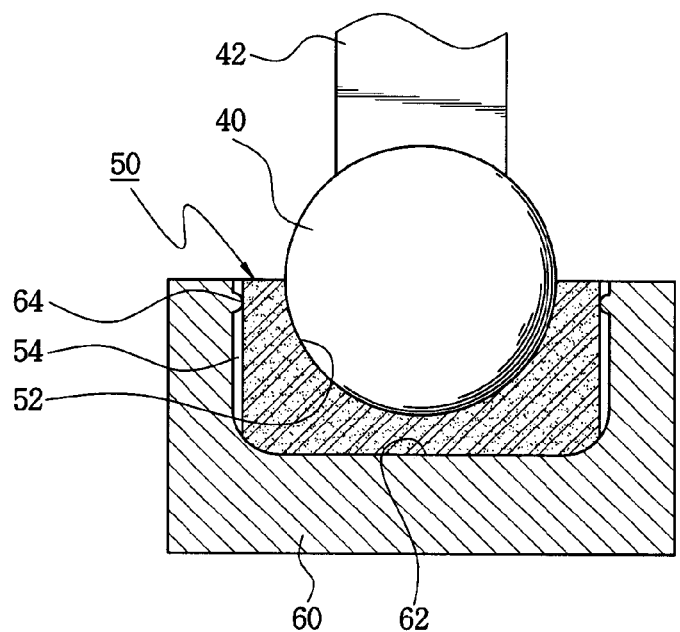
FIG. 2 is a sectional view showing a bearing assembly according to a first embodiment of the present invention.
Figure 3:
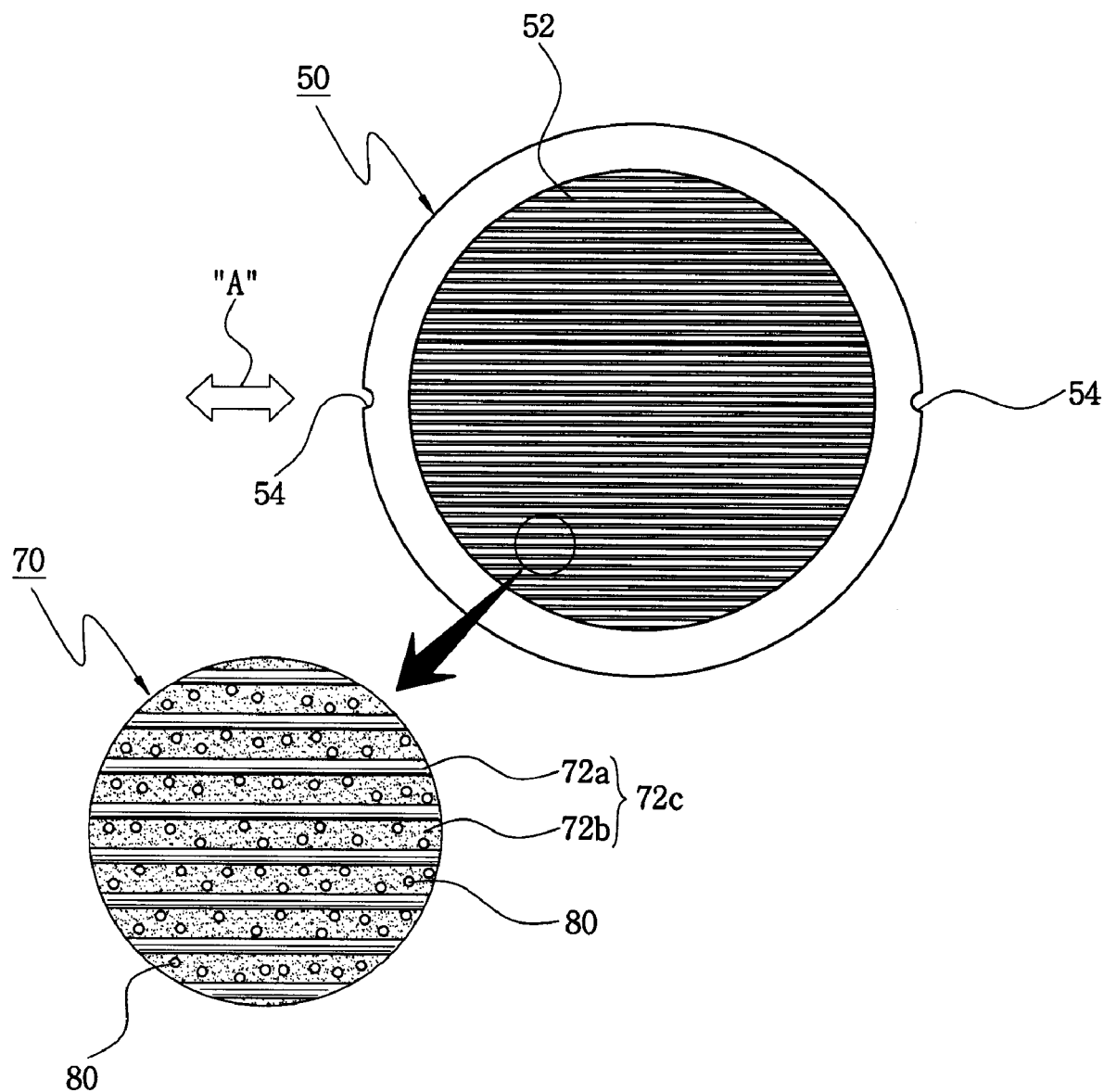
FIG. 3 is a plan view showing the structure of a hemispherical bearing in the bearing assembly of the first embodiment.

First, FIGS. 2 to 6 show a bearing assembly according to a first embodiment of the present invention. Referring to FIGS. 2 and 3, the bearing assembly of the first embodiment comprises a spherical journal 40 and a hemispherical bearing 50. The hemispherical bearing 50 has a generally hemispherical bearing surface 52 for receiving the spherical journal 40 to establish a spherical pair. A plurality of air channels 54 are formed on both outer side surfaces of the hemispherical bearing to impart directivity. A first part such as a connecting rod 42 with a load applied thereto is connected to an outer surface of the spherical journal 40. The hemispherical bearing 50 is embedded in a recess 62 of a second part such as a piston 60, and a plurality of protrusions 64 are formed in the recess 62 of the piston 62 to correspond to and be fitted into the air channels 54. Although the protrusions 64 shown in FIG. 2 and the air channels 54 shown in FIG. 3 are semicircular in cross section, it is for only illustrative purposes. The protrusions 64 and the air channels 54 may be formed to take a variety of shapes such as a rectangle, triangle and dovetail. Further, the protrusions 64 may be formed at a variety of locations in the recess 62 of the piston 60 but may be omitted, if necessary.

Meanwhile, with assembly of the piston and the hemispherical bearing by fitting the protrusions 64 of the piston 60 into the air channels 54 of the hemispherical bearing 50, directivity can be imparted such that the moving direction of the piston 60 is coincident with the moving direction of the spherical journal 40 as indicated by arrow "A" in FIG. 3. Further, due to the air channels 54 of the hemispherical bearing 50, a space between the hemispherical bearing 50 and the piston 60 is prevented from being hermetically sealed when the hemispherical bearing 50 and the piston 60 are assembled, so that the processes of assembling and disassembling the hemispherical bearing 50 and the piston 60 can be conveniently performed.

Figure 4:
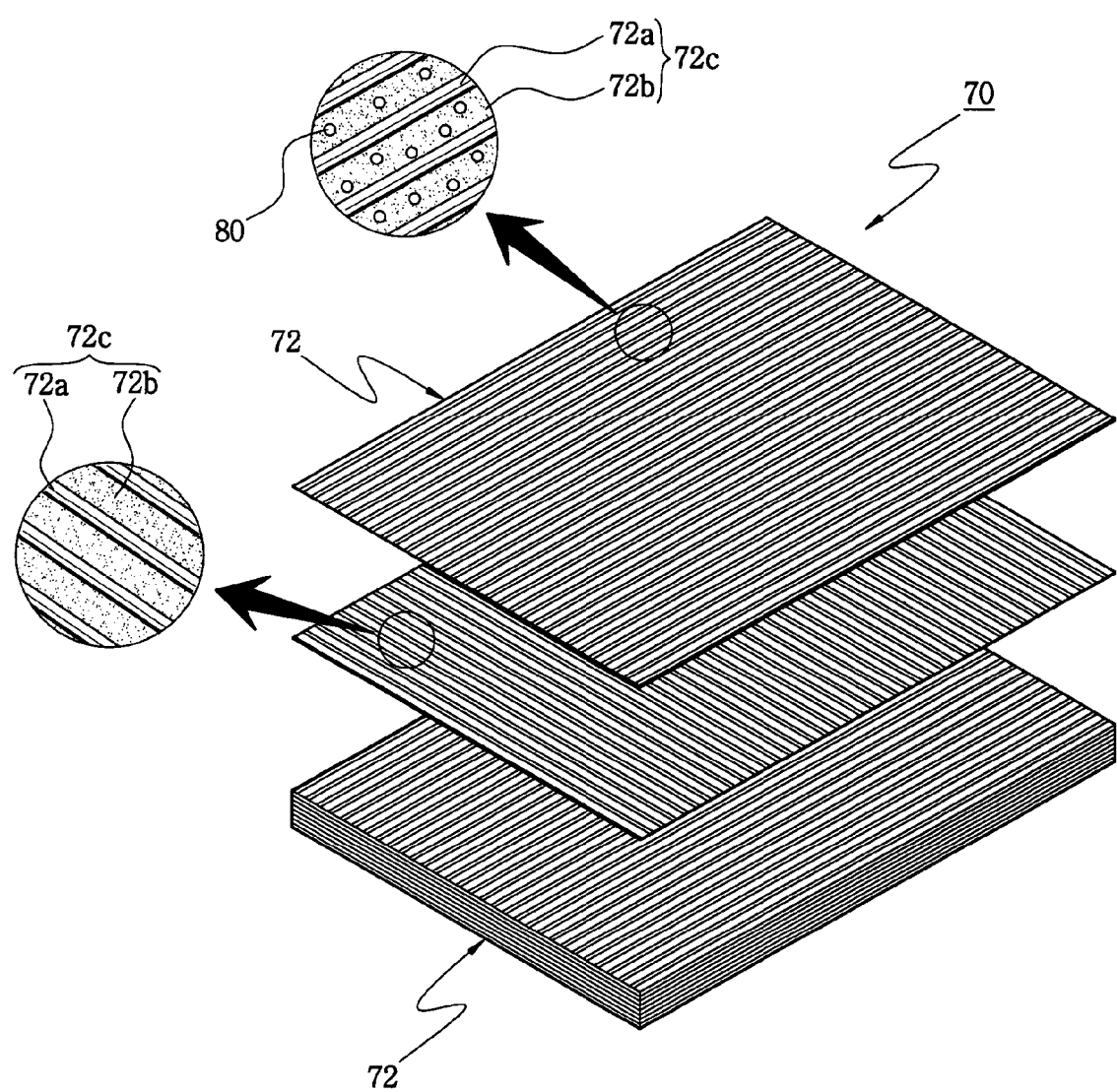
FIG. 4 is a perspective view illustrating the structure of a fiber reinforced composite for use in manufacturing the hemispherical bearing of the first embodiment.

Referring to FIG. 4, the hemispherical bearing 50 is made of a fiber reinforced composite 70 that is constructed by laminating a plurality of uni-directional prepregs 72. In each of the uni-directional prepregs 72, a plurality of elongated reinforcement fibers 72a are arranged at regular intervals and parallel to each other in one direction. The reinforcement fibers 72a are formed into a laminate or sheet in such a manner that they are fixed within a matrix 72b. The reinforcement fibers 72a can be made of carbon fibers or graphite fibers, and the matrix 72b can be made of a polymer resin such as phenolic resin or epoxy resin. Although FIG. 4 shows that the uni-directional prepregs 72 are laminated to be orthogonal to one another, it is only for illustrative purposes. The uni-directional prepregs 72 may be laminated in a transverse direction or quasi-isotropically, if necessary.

Referring to FIGS. 3 and 4, the reinforcement fibers 72a of an uppermost layered uni-directional prepregs 72c are arranged on the bearing surface 52 of the hemispherical bearing 50 to be aligned with the moving direction of the spherical journal 40. With this alignment, the reinforcement fibers 72a made of carbon fibers or graphite fibers with self-lubrication properties can reduce a friction coefficient of the bearing surface 52. That is, the anisotrophy of the reinforcement fibers 72a in view of their wear properties can be utilized maximally. The direction of the reinforcement fibers 72a can be perpendicular to the moving direction of the spherical journal 40 by using reinforcement fibers 72a with a low friction coefficient in a vertical direction. In this case, the air channels 54 of the hemispherical bearing 50 can be formed to be arranged perpendicularly to the direction of the reinforcement fibers 72a. Accordingly, it is possible to conveniently and accurately establish a spherical pair of the spherical journal 40 and the bearing surface 52 in accordance with the direction of the reinforcement fibers 72a indicated by the air channels 54.

Figure 5:
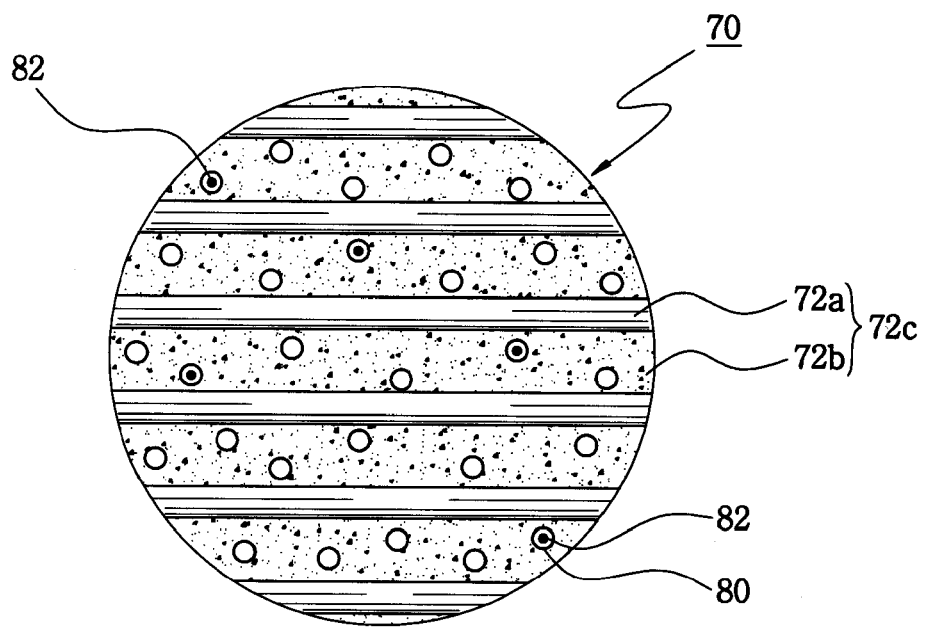
FIG. 5 is a partially enlarged sectional view showing an uppermost layered uni-directional prepreg and particles of a thermosetting resin in the fiber reinforced composite in the first embodiment.

As shown in FIGS. 3 to 5, thermoplastic resin particles 80 with sizes of 100 μm or less are provided in the bearing surface 52 of the hemispherical bearing 50 such that they can be uniformly distributed at a rate of 20% or less based on the volume of the uppermost layered uni-directional prepreg 72c constituting the bearing surface 52. The thermoplastic resin particles 80 are firmly combined with the reinforcement fibers 72a by means of the matrix 72b. If the sizes of the thermoplastic resin particles 80 exceed 100 μm, the combining force by the matrix 72b is lowered. Otherwise, polytetrafluorethylene (PTFE), polyetheretherketone, polyethylene (PE), polystyrene (PS), polypropylene (PP), nylon, or the like may be used as the thermoplastic resin particles 80. If a heavy load is applied to the bearing surface 52, the thermoplastic resin particles 80 reduce the friction coefficient between the spherical journal 40 and the bearing surface 52. The spherical journal 40 is worn due to friction against the bearing surface 52 and simultaneously generates hard particles 82 or debris as shown in FIG. 5. Since the hard particles 82 are captured by the thermoplastic resin particles 80, it is possible to prevent damage to the bearing surface 52 due to the hard particles 82.

Figure 6:
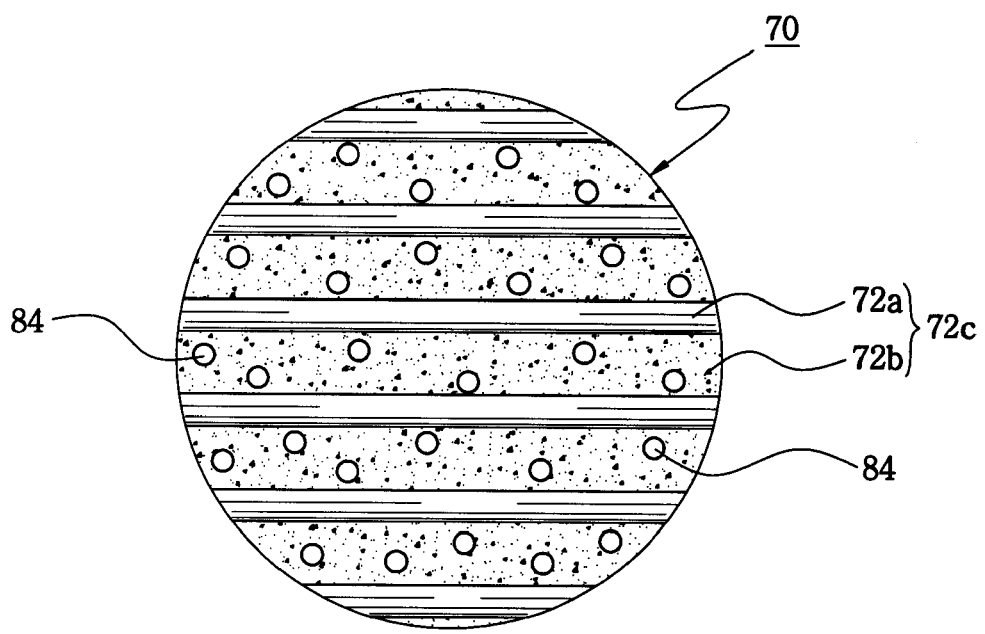
FIG. 6 is a partially enlarged sectional view showing the uppermost layered uni-directional prepreg and self-lubrication particles in the fiber reinforced composite in the first embodiment.

As shown in FIG. 6, instead of the thermoplastic resin particles 80, self-lubrication particles 84 with a low friction coefficient can be uniformly provided in the bearing surface 52 of the hemispherical bearing 50 at a rate of 10% or less based on the volume of the uppermost layered uni-directional prepreg 72c. The self-lubrication particles 84 are combined with the matrix 72b. Fine carbon particles, carbon nanotubes, graphite particles, molybdenum disulphide ($MoS_2$) or the like with sizes in the order of nanometer or micrometer can be used as the self-lubrication particles 84. In a case where the moving speed of the spherical journal 40 is very low in the order of several or less Hz and a heavy load is applied, the self-lubrication particles 84 reduce the friction coefficient, thereby preventing wear.

Figure 7A:
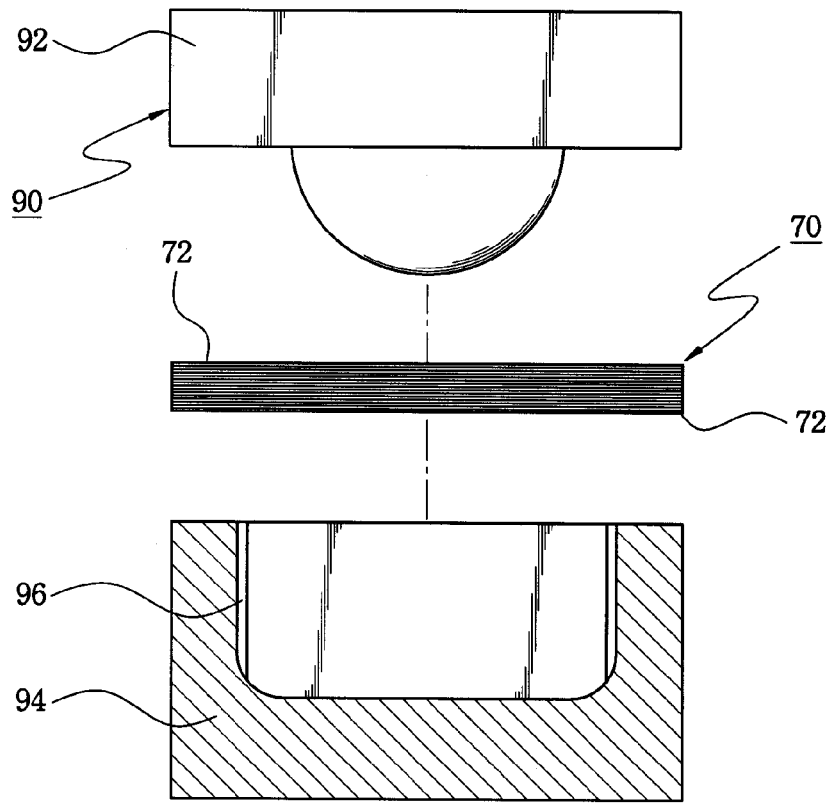
FIGS. 7A and 7B are views illustrating a method for manufacturing the hemispherical bearing of the first embodiment.
Figure 7B:
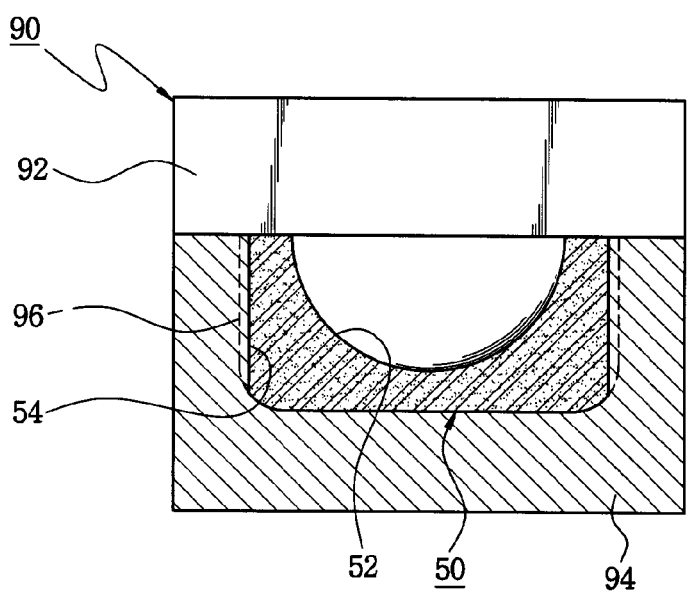

Referring to FIGS. 7A and 7B, in the bearing assembly of the first embodiment, the fiber reinforced composite 70 which is constructed by laminating the plurality of uni-directional prepregs 72 is subjected to hot compression molding to be used as the material for the hemispherical bearing 50. A mold set 90 used for the hot compression molding of the fiber reinforced composite 70 comprises a convex mold 92 and a concave mold 94. A core 96 for forming the air channels 54 of the hemispherical bearing 50 is provided on an inner surface of the concave mold 94.

Referring to FIGS. 5, 6 and 7A, the fiber reinforced composite 70 is supplied between the convex mold 92 and the concave mold 94 of the mold set 90 to perform the hot compression molding of the fiber reinforced composite 70. The thermoplastic resin particles 80 or self-lubrication particles 84 are uniformly distributed on the surface of the uppermost layered uni-directional prepreg 72c of the fiber reinforced composite 70. Next, as shown in FIG. 7B, in a state where the temperature of the convex mold 92 and the concave mold 94 rises to the melting point of the matrix 72b, the convex mold 92 and the concave mold 94 are closed to compress the fiber reinforced composite 70. Then, the fiber reinforced composite 70 is formed into the hemispherical bearing 50. At this time, heat from the convex mold 92 and the concave mold 94 is transferred to the matrix 72b of the fiber reinforced composite 70 such that the matrix 72b of the fiber reinforced composite 70 is melted. Accordingly, the reinforcement fibers 72a, the thermoplastic resin particles 80, and the self-lubrication particles 84 are firmly fixed in the molten matrix 72b.

The reinforcement fibers 72a are arranged at certain intervals in multiple layers by means of crosslinkage with the matrix 72b. Further, the air channels 54 are formed on the outer surface of the hemispherical bearing 50 by the core 96 in the concave mold 94. Lastly, the convex mold 92 and the concave mold 94 are opened to separate the molded hemispherical bearing 50 therefrom, and the hemispherical bearing is then cooled and solidified to obtain the finished hemispherical bearing 50. As described above, the fiber reinforced composite 70 is used as the material with which the hemispherical bearing 50 can be conveniently and accurately manufactured through near-net manufacturing, which does not need additional processing, by means of hot compression molding.

Figure 8:
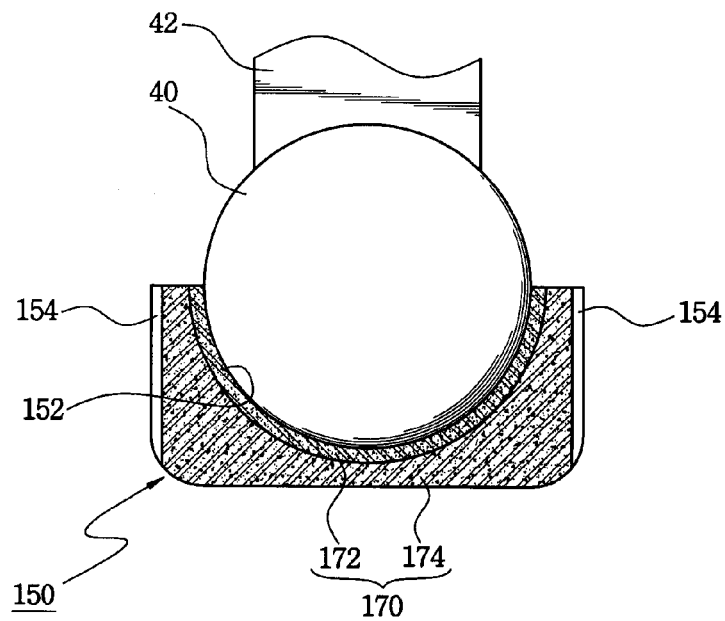
FIG. 8 is a sectional view showing a bearing assembly according to a second embodiment of the present invention.
Figure 9:
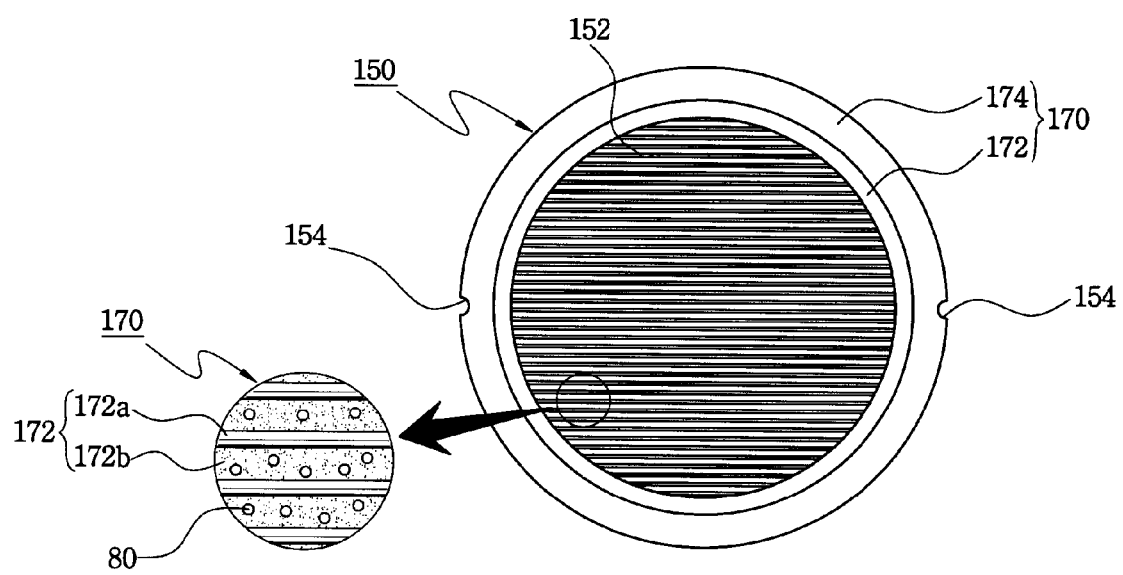
FIG. 9 is a plan view showing the structure of a hemispherical bearing in the bearing assembly of the second embodiment.

FIGS. 8 and 9 show a bearing assembly according to a second embodiment of the present invention. Referring to FIGS. 8 and 9, like the bearing assembly of the first embodiment, the bearing assembly of the second embodiment comprises the spherical journal 40 with the connecting rod 42 connected thereto and a hemispherical bearing 150 made of a fiber reinforced composite 170. The hemispherical bearing 150 has a bearing surface 152 and air channels 154, which are the same as the bearing surface 52 and the air channels 54 of the hemispherical bearing 50 of the first embodiment in view of their structures. Further, the thermoplastic resin particles 80 or self-lubrication particles 84 are provided on the bearing surface 152 of the hemispherical bearing 150.

Figure 10:
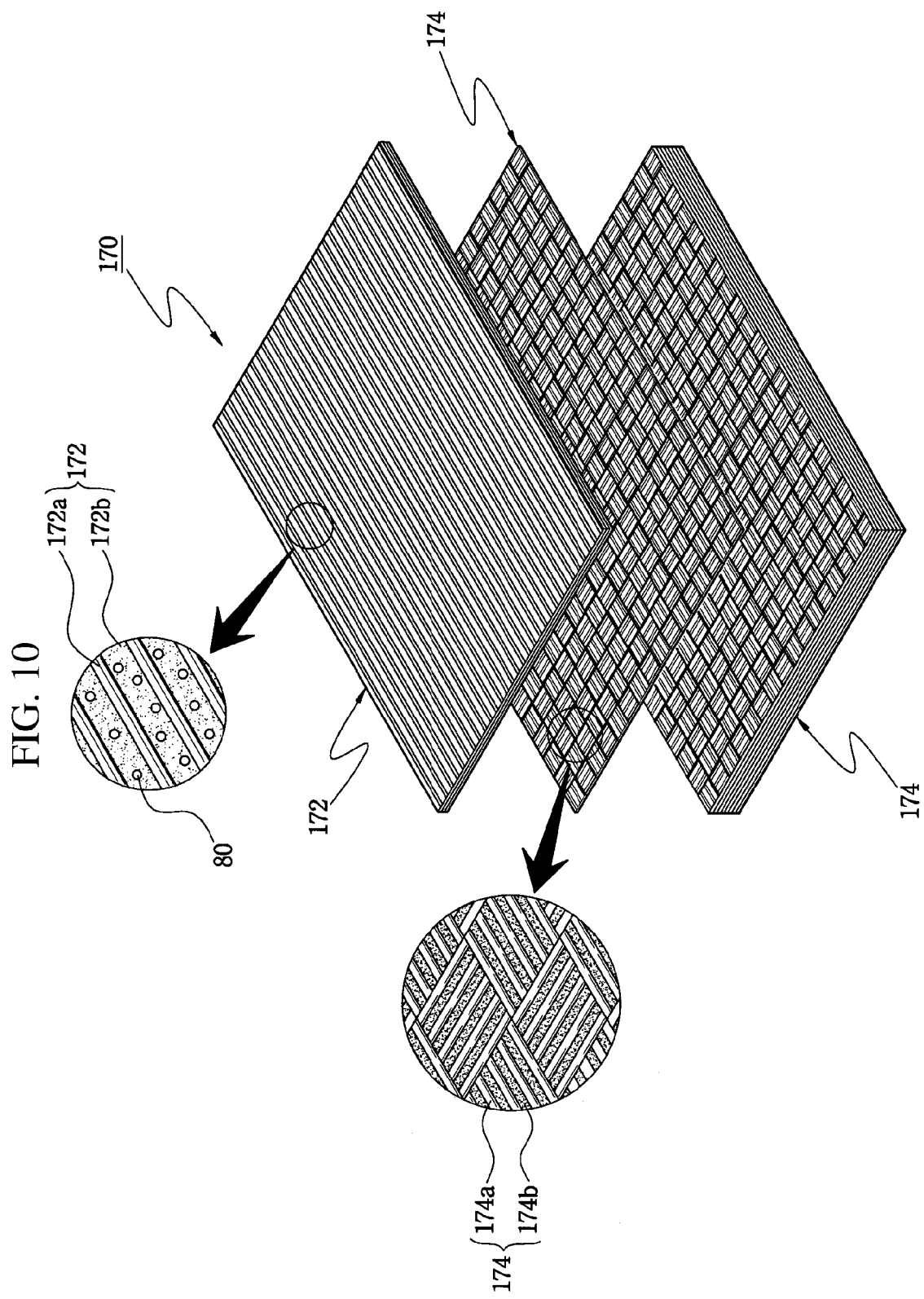
FIG. 10 is a perspective view illustrating the structure of a fiber reinforced composite for use in manufacturing the hemispherical bearing of the second embodiment.

As shown in FIG. 10, the fiber reinforced composite 170 employs a uni-directional prepreg 172 and a plurality of woven fabric prepregs 174. The uni-directional prepreg 172 comprises reinforcement fibers 172a and a matrix 172b, which are the same as the reinforcement fibers 72a and the matrix 72b of the uni-directional prepreg 72 in the first embodiment. The uni-directional prepreg 172 is arranged as the uppermost layer to form the bearing surface 152 of the hemispherical bearing 150. Prior to hot compression molding, the thermoplastic resin particles 80 or self-lubrication particles 84 are uniformly provided on the top of the uppermost layered uni-directional prepreg 172, and these thermoplastic resin particles 80 or self-lubrication particles 84 are fixed in the matrix 172b by means of hot compression molding. Although FIG. 10 shows that the plurality of uni-directional prepregs 172 are laminated, the uni-directional prepreg 172 can be formed in a single layer, if necessary.

Each of the woven fabric prepregs 174 is formed by weaving yarns combined with reinforcement fibers 174a into a form such as woven fabrics, and the matrix 174b is added thereto in the same manner as the unit-directional prepreg 172. The woven fabric prepregs 174 have the reinforcement fibers 174a entangled with one another and thus have a property resistant to structural damage such as interlaminar peeling. The woven fabric prepregs 174 are laminated beneath the uni-directional prepreg 172, and the laminated uni-directional prepreg 172 and woven fabric prepregs 174 are manufactured into the hemispherical bearing 150 by means of hot compression molding using the convex mold 92 and the concave mold 94 of the mold set 90 shown in FIGS. 7A and 7B. The uni-directional prepreg 172 becomes the bearing surface 152 of the hemispherical bearing 150 and the woven fabric prepregs 174 become remaining portions of the hemispherical bearing 150. Further, the air channels 154 are formed on the outer surface of the hemispherical bearing 150 by the core 96 of the concave mold 94.

Figure 11:
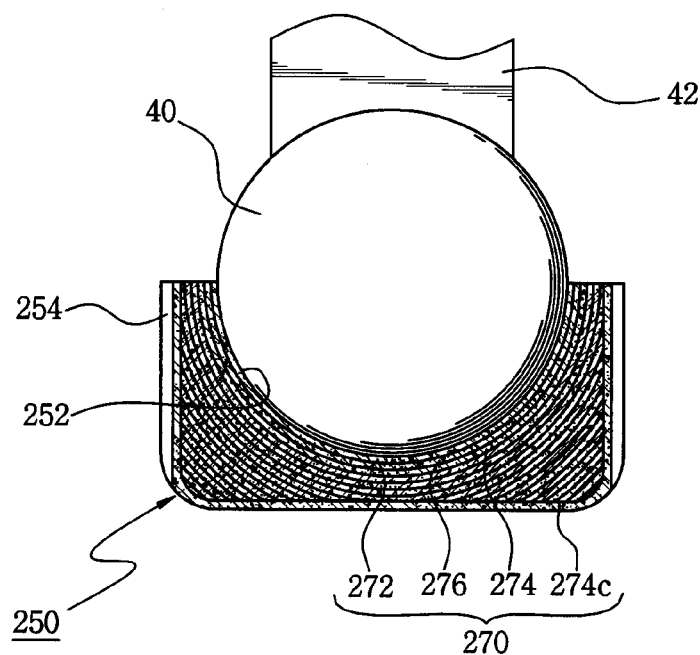
FIG. 11 is a sectional view showing a bearing assembly according to a third embodiment of the present invention.
Figure 12:
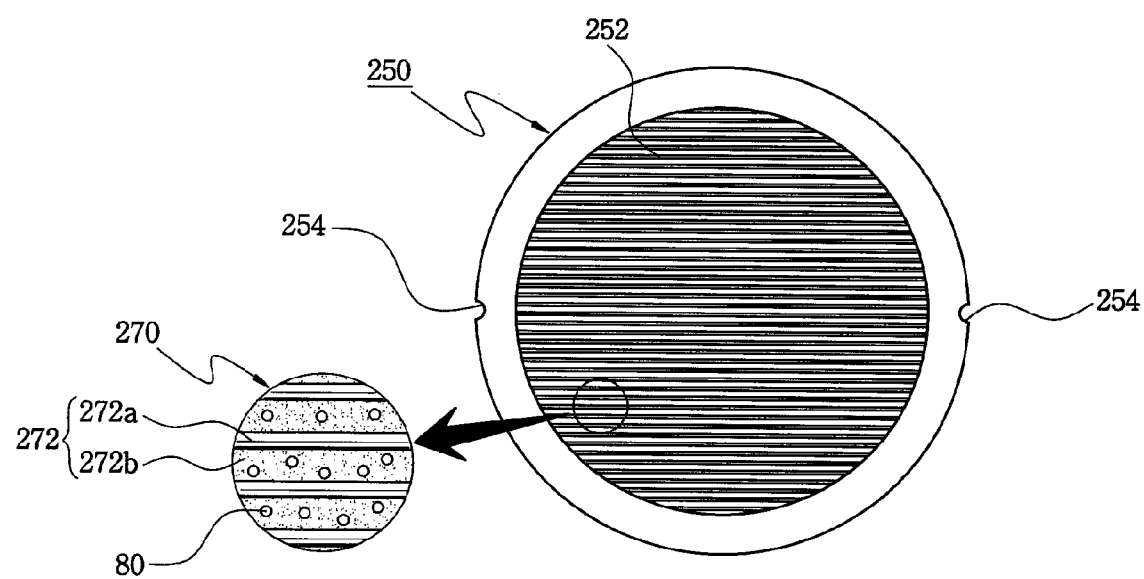
FIG. 12 is a plan view showing the structure of a hemispherical bearing in the bearing assembly of the third embodiment.

FIGS. 11 and 12 show a bearing assembly according to a third embodiment of the present invention. Referring to FIGS. 11 and 12, like the bearing assembly of the first and second embodiments, the bearing assembly of the third embodiment comprises the spherical journal 40 with the connecting rod 42 connected thereto and a hemispherical bearing 250 made of a fiber reinforced composite 270. The hemispherical bearing 250 has a bearing surface 252 and air channels 254, which are the same as the bearing surfaces 52 and 152 and the air channels 54 and 154 of the hemispherical bearings 50 and 150 of the first and second embodiments in view of their structures. Further, the thermoplastic resin particles 80 or self-lubrication particles 84 are provided on the bearing surface 252 of the hemispherical bearing 250.

Figure 13:
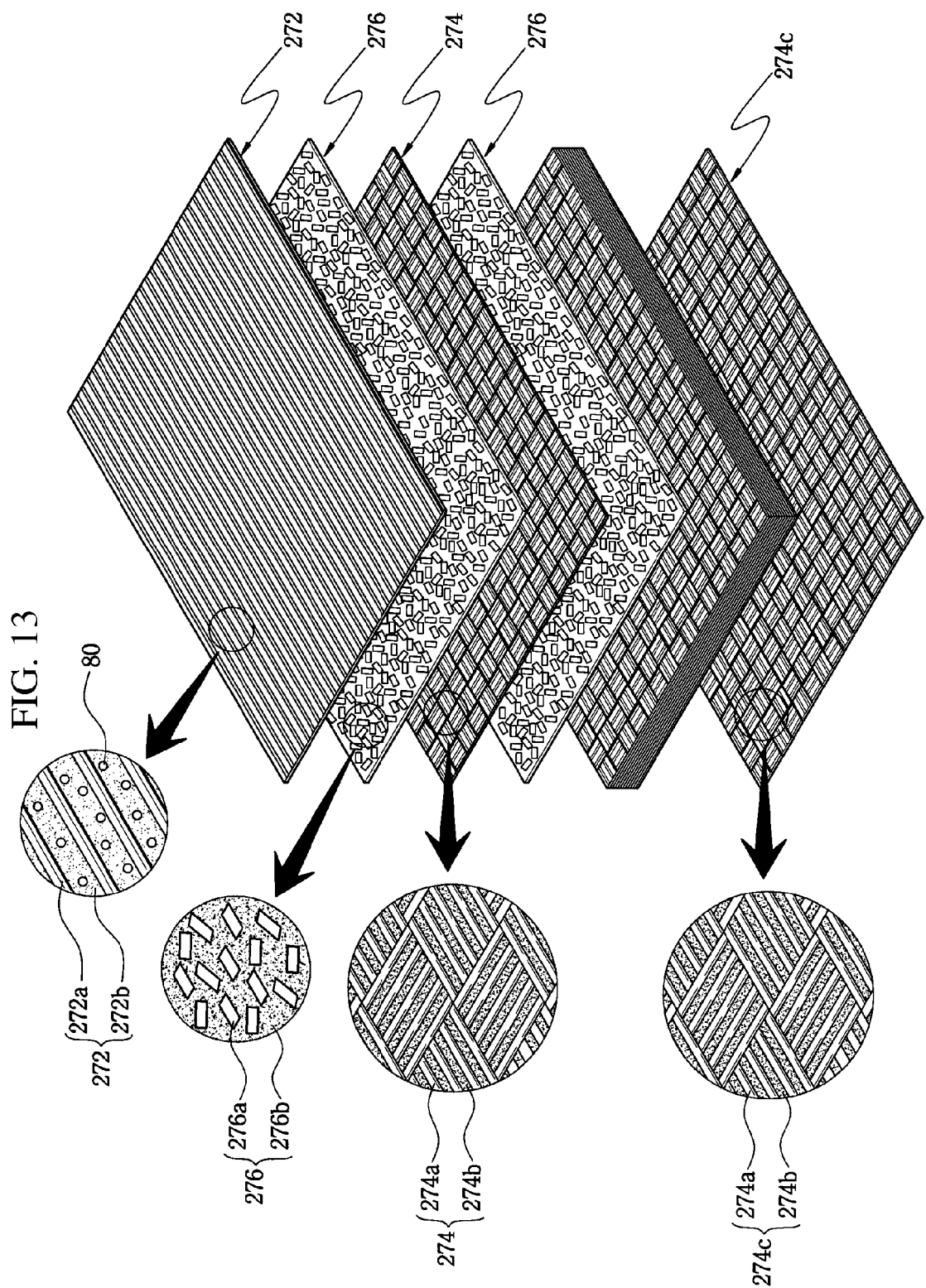
FIG. 13 is a perspective view illustrating the structure of a fiber reinforced composite for use in manufacturing the hemispherical bearing of the third embodiment.

As shown in FIGS. 11 and 13, the fiber reinforced composite 270 comprises a uni-directional prepreg 272, a plurality of woven fabric prepregs 274 and staple-fiber prepregs 276. Each of the uni-directional prepreg 272 and the woven fabric prepregs 274 comprises reinforcement fibers 272a and 274a and matrixes 272b and 274b in the same manner as the uni-directional prepreg 172 and the woven fabric prepreg 174 in the second embodiment, respectively. Generally, the staple-fiber prepregs 276 can be manufactured by a process that is simpler than the process for manufacturing the uni-directional prepreg 272 and the woven fabric prepregs 274, and have an advantage in that production costs can be reduced.

Meanwhile, in the fiber reinforced composite 270, the uni-directional prepreg 272 is arranged as an uppermost layer, and a lowermost layered woven fabric prepreg 274c with the same structure as the woven fabric prepreg 274 is arranged as a lowermost layer. Further, the plurality of woven fabric prepregs 274 and the staple-fiber prepregs 276 are laminated and arranged in a sandwich-like form between the uni-directional prepreg 272 and the lowermost layered woven fabric prepreg 274c. As described above, the laminated uni-directional prepreg 272, woven fabric prepregs 274, single-fiber prepregs 276 and the lowermost layered woven fabric prepreg 274c are manufactured into the hemispherical bearing 250 by means of hot compression molding. The uni-directional prepreg 272 becomes the bearing surface 252 of the hemispherical bearing 250 and the lowermost layered woven fabric prepreg 274c becomes an outer surface of the hemispherical bearing 250. The plurality of air channels 254 are formed on the lowermost layered woven fabric prepreg 274c constituting the outer surface of the hemispherical bearing 250. In addition, the staple-fiber prepregs 276 serve as a filler with which the interior of the hemispherical bearing 250 is filled.

Superior wear resistant properties of the uni-directional prepreg 272 and the lowermost layered fabric prepreg 274c assure the reliability of the hemispherical bearing 250. Although the staple-fiber prepregs 276 filled into the interior of the hemispherical bearing 250 have a compression strength lower than that of the uni-directional prepreg 272 and the fabric prepregs 274, there is an advantage in that it is possible to reduce production costs without deterioration of the reliability of the hemispherical bearing 250, due to the application of a relatively smaller compression force to the interior of the hemispherical bearing 250. Otherwise, the lowermost layered fabric prepreg 274c constituting the outer surface of the hemispherical bearing 250 may be substituted with a uni-directional prepreg, if necessary.

Figure 14:
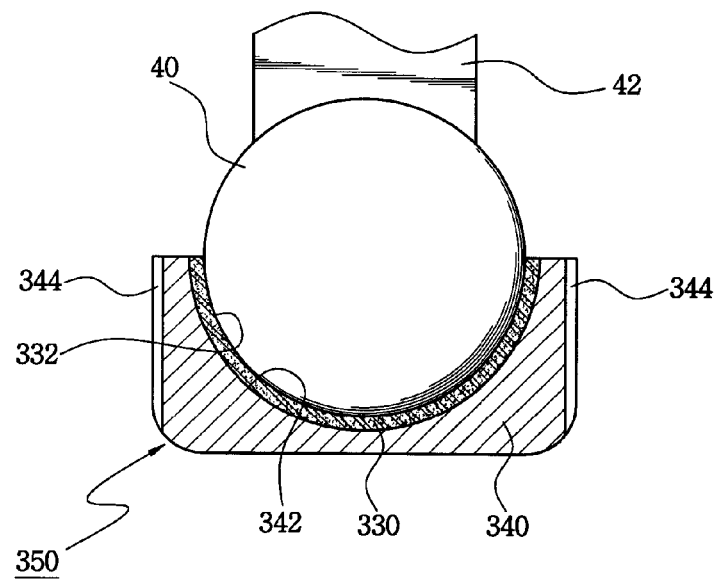
FIG. 14 is a sectional view showing a bearing assembly according to a fourth embodiment of the present invention.
Figure 15:
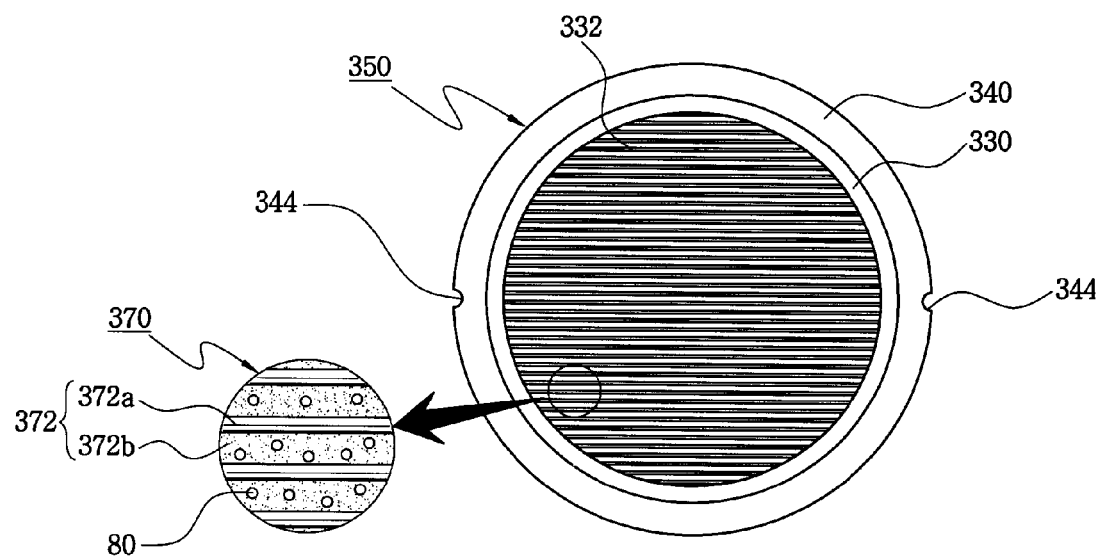
FIG. 15 is a plan view showing the structure of a hemispherical bearing in the bearing assembly of the fourth embodiment.

FIGS. 14 and 15 show a bearing assembly according to a fourth embodiment of the present invention. Referring to FIGS. 14 and 15, the bearing assembly of the fourth embodiment comprises the spherical journal 40 with the connecting rod 42 connected thereto and a hemispherical bearing 350. The hemispherical bearing 350 comprises a bushing 330 that is made of a fiber reinforced composite 370 and has a bearing surface 332 for receiving the spherical journal 40 to establish a spherical pair, and a housing 340 with a recess 342 in which the bushing 330 is fixedly mounted. The bushing 330 has a generally hemispherical outer shape and is completely embedded in the recess 342 of the housing 340. Air channels 344 are formed on both outer surfaces of the housing 340 in opposite directions. The housing 340 can be manufactured by means of die casting or forging out of a metal with superior thermal conductivity, such as aluminum, so as to radiate frictional heat generated by friction between the spherical journal 40 and the bearing surface 332. Due to the radiation of the frictional heat through the housing 340, adhesion between and deterioration of the spherical journal 40 and the bearing surface 332 can be prevented, thereby assuring the life of the bearing assembly. Further, like the hemispherical bearings 50, 150 and 250 of the first, second and third embodiments, a friction coefficient between the spherical journal 40 and the bearing surface 332 can be decreased by the bushing 330 of the hemispherical bearing 350.

Figure 16A:
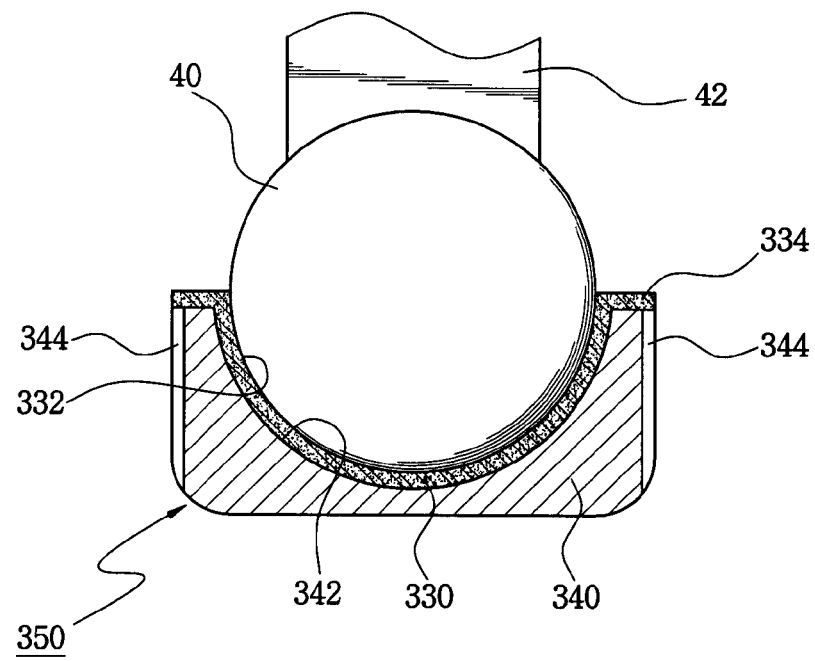
FIGS. 16A and 16B are sectional views showing variations of the hemispherical bearing according to the fourth embodiment of the present invention.
Figure 16B:
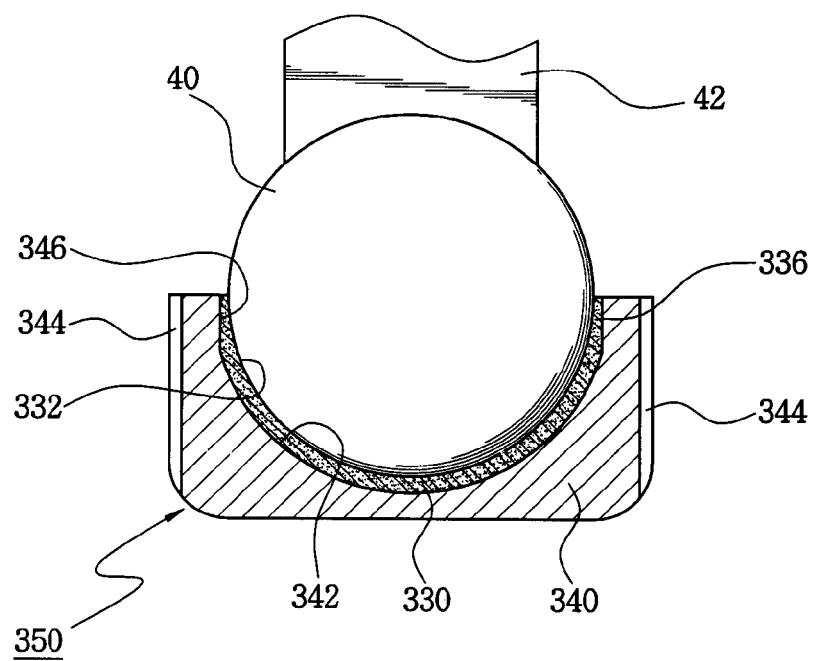

FIGS. 16A and 16B show variations of the bearing assembly according to the fourth embodiment of the present invention. As shown in FIG. 16A, the bushing 330 is fixedly mounted in the recess 342 of the housing 340. An end portion of the bushing 330 is formed as a bent section 334 that covers an upper surface of the housing 340. The bent section 334 of the bushing 330 causes the connecting rod 42 not to come into direct contact with the housing 340, so that wear of the connecting rod 42 and the housing 340 can be prevented. Further, the connecting rod 42 is prevented from coming into contact with an end surface of the bushing 330, thereby avoiding interlaminar peeling in the fiber reinforced composite 370.

As shown in FIG. 16B, a flat section 336 is formed at an upper portion of an outer surface of the bushing 330. The flat section 336 of the bushing 330 is brought into close contact with a flat section 346 formed at an upper portion of the recess 342. Reinforcement fibers of the fiber reinforced composite 370 generally have a property in which thermal conductivity in a longitudinal direction is about ten times as large as thermal conductivity in a radial direction. Accordingly, heat is effectively transmitted to the housing 340 through an end of the fiber reinforced composite 370 by close contact of the flat section 336 of the bushing 330 with the flat section 346 of the housing 340.

Figure 17:
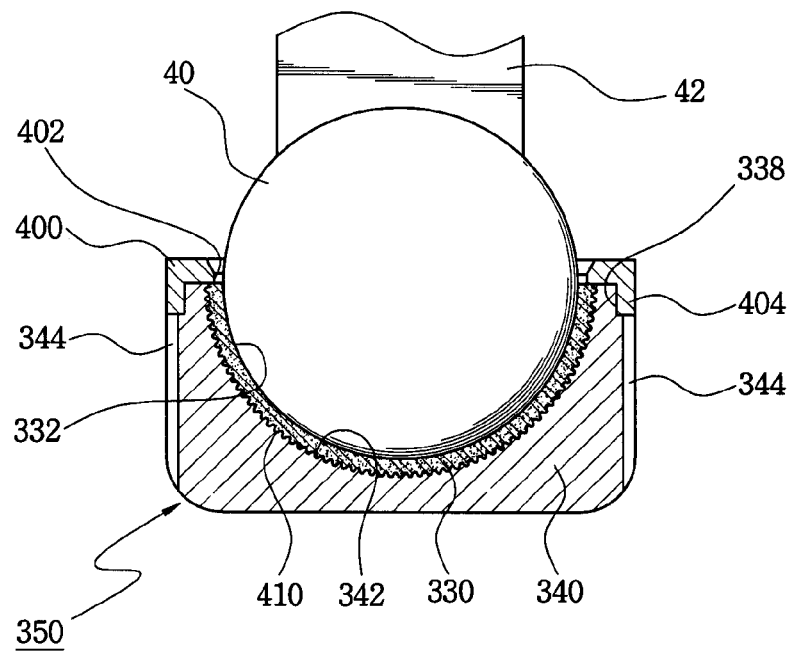
FIG. 17 is a sectional view showing a bearing assembly according to a fifth embodiment of the present invention.

FIG. 17 shows a bearing assembly according to a fifth embodiment of the present invention. Elements of the bearing assembly of the fifth embodiment similar to those of the bearing assembly of the fourth embodiment shown in FIGS. 15 and 16 are designated by like reference numerals and will not be described in detail. Referring to FIG. 17, a ring 400 made of a metal such as aluminum is coupled to the upper surface of the housing 340 to prevent the bushing 330 from separating. The ring 400 is constructed such that the diameter of a hole 402 of the ring 400 is larger than that of the spherical journal 40 so that the ring 400 does not interfere with the spherical journal 40. A flange 404 is formed on an edge of a lower surface of the ring 400, and the flange 404 is interference-fitted over a coupling recess 338 formed at an upper portion of the outer surface of the housing 340. The ring 400 supports the end of the bushing 330 to prevent the bushing from separating from the housing 340, and receives and dissipates heat from the bushing 330.

A plurality of protrusions and depressions 410 are formed in the recess 342 of the housing 340. Spaces between the protrusions and depressions 410 are filled with the matrix of the fiber reinforced composite 370 that are melted during hot compression molding, and a contact area between the recess 342 and the bushing 330 increases. Accordingly, coupling force between the bushing 330 and the housing 340 increases, so that the bushing 330 can be prevented from separating from the housing 340. Although FIG. 17 shows that the protrusions and depressions 410 take a wavy shape in section, it is only for illustrative purposes. The sectional shape of the protrusions and depressions 410 can be variously modified into a triangular shape, a diamond shape or the like.

Figure 18:
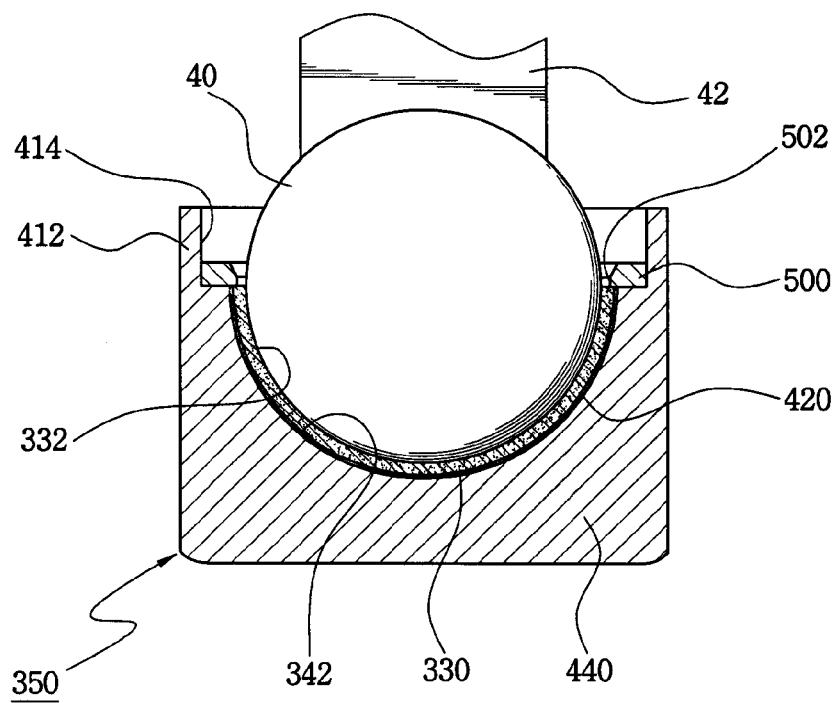
FIG. 18 is a sectional view showing a bearing assembly according to a sixth embodiment of the present invention.

FIG. 18 shows a bearing assembly according to a sixth embodiment of the present invention. Elements of the bearing assembly of the sixth embodiment similar to those of the bearing assembly of the fifth embodiment shown in FIG. 17 are designated by like reference numerals and will not be described in detail. Referring to FIG. 18, a boss 412 extends from an edge of an upper surface of a housing 440, and a ring 500 is coupled to a hole 414 defined by the boss 412 to support the bushing 330. The ring 500 is constructed such that the diameter of a hole 502 of the ring 500 is larger than that of the spherical journal 40 so that the ring does not interfere with the spherical journal 40. The housing 440 may be manufactured to have the same outer shape as the piston 60 shown in FIG. 2 by eliminating the air channels 344, so that the housing can be used as the hemispherical bearing 350 with the function of the piston 60.

In a case where the housing 440 is made of aluminum and the reinforcement fibers of the fiber reinforced composite 370 are made of carbon fibers, galvanic corrosion of aluminum may occur due to potential difference between the aluminum and carbon fibers. In the bearing assembly according to the sixth embodiment of the present invention, a glass fiber reinforced composite 420 is interposed between the bushing 330 made of carbon fibers and the housing 440 made of aluminum to prevent the galvanic corrosion of the aluminum.

Figure 19A:
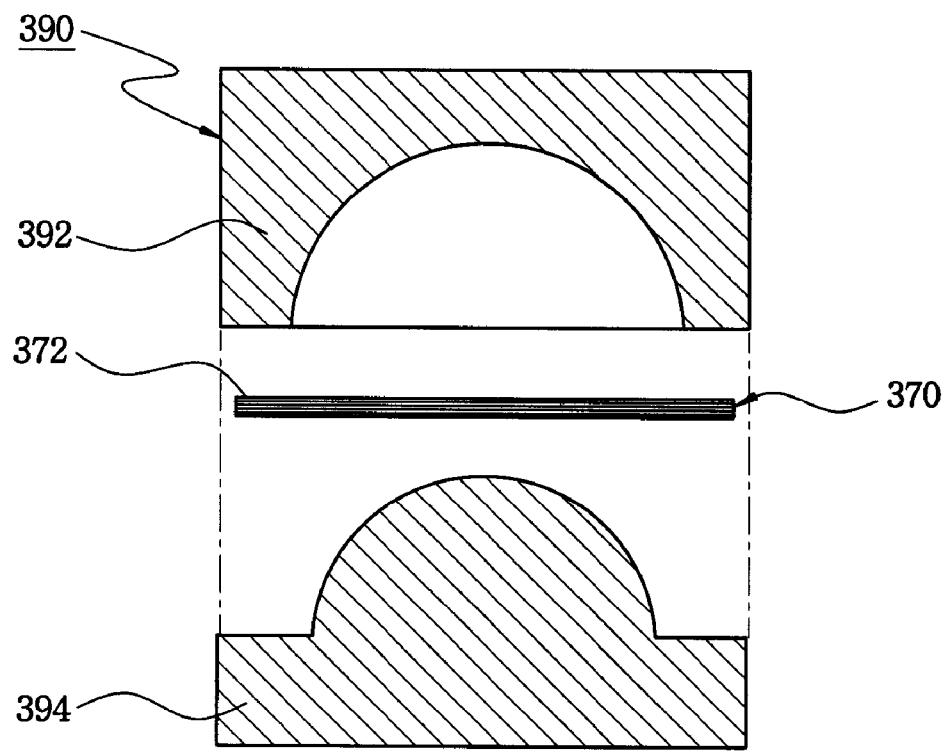
FIGS. 19A to 19D are views illustrating a method for manufacturing the hemispherical bearing of the fourth embodiment of the present invention.

Now, a method for manufacturing the bushing of the hemispherical bearing of the fourth embodiment will be described with reference to FIGS. 19A to 19D. First of all, as shown in FIGS. 15 and 19A, the uni-directional prepregs 372 comprising the plurality of reinforcement fibers 372a and the matrix 372b combining the reinforcement fibers 372a are used as the fiber reinforced composite 370. The fiber reinforced composite 370 in which the plurality of uni-directional prepregs 372 are laminated is supplied between a convex mold 392 and a concave mold 394 of a mold set 390, the thermoplastic resin particles 80 or self-lubrication particles 84 are uniformly distributed on the surface of the uppermost layered uni-directional prepreg 372 of the fiber reinforced composite 370.

Figure 19B:
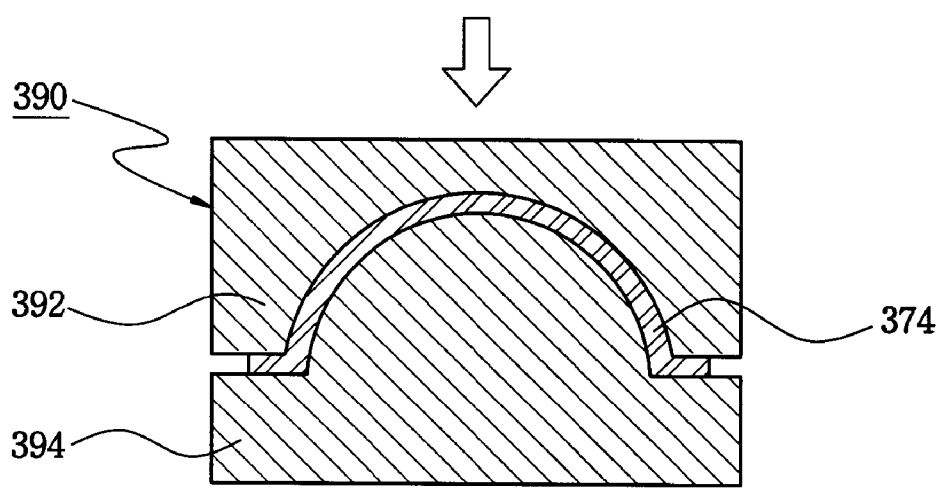

Then, as shown in FIG. 19B, the temperature of the convex mold 392 and the concave mold 394 is raised to the melting point of the matrix 372b. For example, upon hot compression molding of a fiber reinforced composite 370 comprising carbon fibers and a phenolic resin, the temperature is raised to 155° C. or more. Once the convex mold 392 and the concave mold 394 are closed to compress the fiber reinforced composite 370, the fiber reinforced composite 370 is molded into a hemispherical bushing preform 374. At this time, the matrix 372b of the fiber reinforced composite 370 is melted and the reinforcement fibers 372a, the thermoplastic resin particles 80 and self-lubrication particles 84 are firmly fixed in the melted matrix 372b.

Figure 19C:
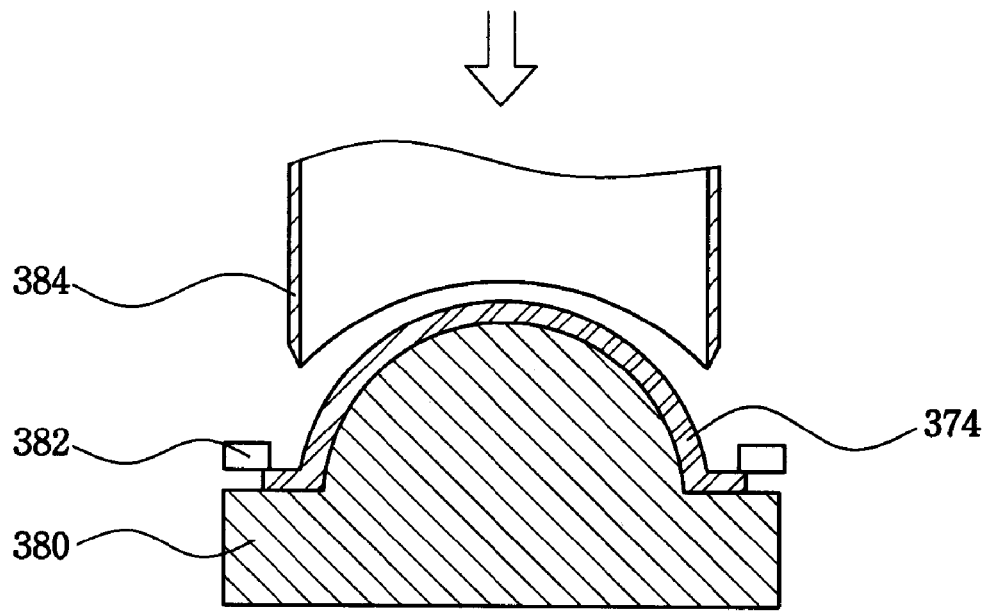
Figure 19D:
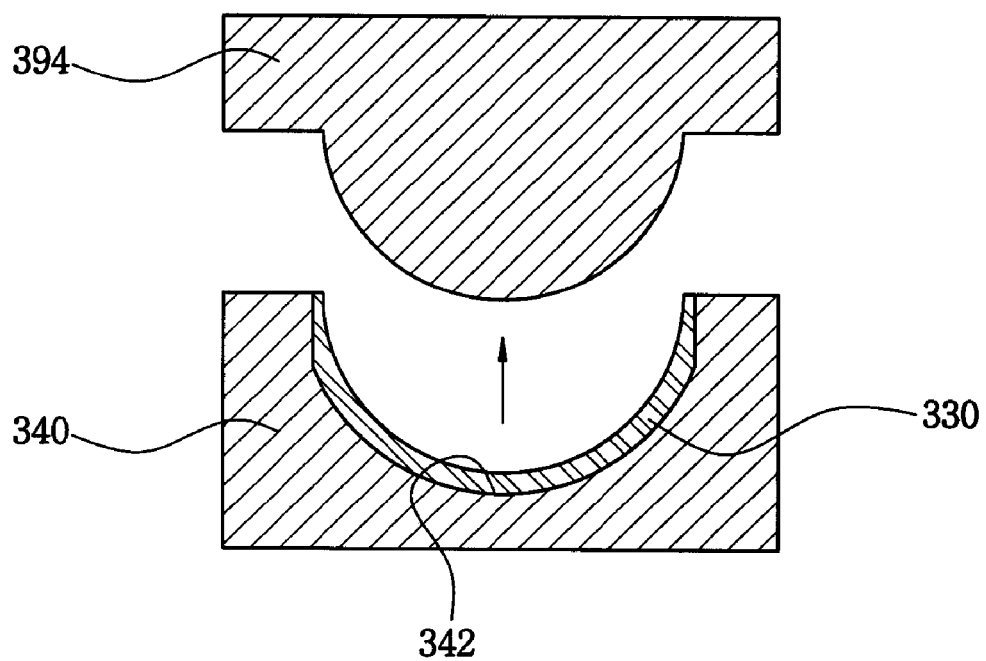

As shown in FIG. 19C, after the bushing preform 374 is put on a block die 380, an edge of the bushing preform 374 is fixed to the block die 380 by a clamp 382. The edge of the bushing preform 374 is cut using a cutter 384. Lastly, as shown in FIG. 19D, after the bushing perform 374 is mounted in the recess 342 of the housing 340, the bushing preform 374 mounted in the recess 342 of the housing 340 is compressed by the convex mold 392, thereby molding the bushing preform into the complete bushing 330. As described above, the hemispherical bearing 350 can be conveniently and accurately manufactured through near-net manufacturing in which the bushing 330 is integrally fixed to the housing 340 by means of hot compression molding of the metal housing 340 and the bushing preform 374.

According to the bearing assembly according to the present invention described above, since a bearing surface that establishes a spherical pair with a spherical journal is made of a fiber reinforced composite with self-lubrication properties, mechanical strength is secured and a friction coefficient is reduced, thereby greatly improving reliability. Further, since lubrication performance is enhanced and hard particles generated due to wear are captured, the life of the bearing assembly can be assured. Further, there are advantages in that stress concentration at the bearing surface can be alleviated by forming air channels, which can impart directivity, on an outer surface of a hemispherical bearing, and the hemispherical bearing can be conveniently assembled and disassembled to and from other parts. Moreover, a bushing made of a fiber reinforced composite and a housing made of a material with superior thermal conductivity can be conveniently and accurately manufactured into a hemispherical bearing through near-net manufacturing. Adhesion between and deterioration of the spherical journal and the bearing surface are prevented by dissipating frictional heat through the housing to assure the life of the bearing assembly.

The aforementioned embodiments are only preferred embodiments of the present invention. The scope of the present invention is not limited to the embodiments. It should be understood that those skilled in the art can make various changes, modifications and substitutions thereto within the technical spirit and scope of the present invention defined by the appended claims, and such embodiments fall within the scope of the present invention.

What is claimed is:

1. A bearing assembly, comprising:
   a spherical journal;
   a bushing made of a fiber reinforced composite, the fiber reinforced composite having a plurality of reinforcement fibers arranged at certain intervals in multiple layers and fixed in a matrix, the bushing having a bearing surface for establishing a spherical pair with the spherical journal; and
   a housing having a recess to which the bushing is fixed;
   wherein the reinforcement fibers exposed to the bearing surface of the bushing are arranged in one direction to be aligned with a moving direction of the spherical journal.

2. The bearing assembly according to claim 1, wherein the reinforcement fibers comprise carbon fibers or graphite fibers.

3. The bearing assembly according to claim 1, wherein the bearing surface of the bushing is provided with thermoplastic resin particles fixed in the matrix.

4. The bearing assembly according to claim 1, wherein the bearing surface of the bushing is provided with self-lubrication particles fixed in the matrix.

5. The bearing assembly according to claim 1, wherein the fiber reinforced composite comprises a plurality of uni-directional prepregs having reinforcement fibers arranged in one direction.

6. The bearing assembly according to claim 1, wherein the housing has a plurality of air channels formed on an outer surface thereof to impart directivity.

7. The bearing assembly according to claim 6, wherein a member to which the housing is to be mounted has a plurality of protrusions fitted into the air channels.

8. The bearing assembly according to claim 1, wherein the recess of the housing is formed with a plurality of protrusions and depressions.

9. The bearing assembly according to claim 1, wherein a ring is coupled to the housing to support an end of the bushing and to prevent the bushing from separating from the housing.

10. The bearing assembly according to claim 1, wherein the housing is made of a metal with thermal conductivity.

11. The bearing assembly according to claim 1, wherein the fiber reinforced composite has carbon fibers, and the housing is made of aluminum.

12. The bearing assembly according to claim 11, wherein a glass fiber reinforced composite is further provided between the housing made of aluminum and the fiber reinforced composite having the carbon fibers.

13. A bearing assembly, comprising:
    a spherical journal;
    a bushing made of a fiber reinforced composite, the fiber reinforced composite having a plurality of reinforcement fibers arranged at certain intervals in multiple layers and fixed in a matrix, the bushing having a bearing surface for establishing a spherical pair with the spherical journal; and
    a housing having a recess to which the bushing is fixed;
    wherein the fiber reinforced composite comprises a plurality of uni-directional prepregs having reinforcement fibers arranged in one direction.

14. A bearing assembly, comprising:
    a spherical journal;
    a bushing made of a fiber reinforced composite, the fiber reinforced composite having a plurality of reinforcement fibers arranged at certain intervals in multiple layers and fixed in a matrix, the bushing having a bearing surface for establishing a spherical pair with the spherical journal; and
    a housing having a recess to which the bushing is fixed;
    wherein the housing has a plurality of air channels formed on an outer surface thereof to impart directivity.

15. The bearing assembly according to claim 14, wherein a member to which the housing is to be mounted has a plurality of protrusions fitted into the air channels.

* * * * *